Patented May 24, 1932

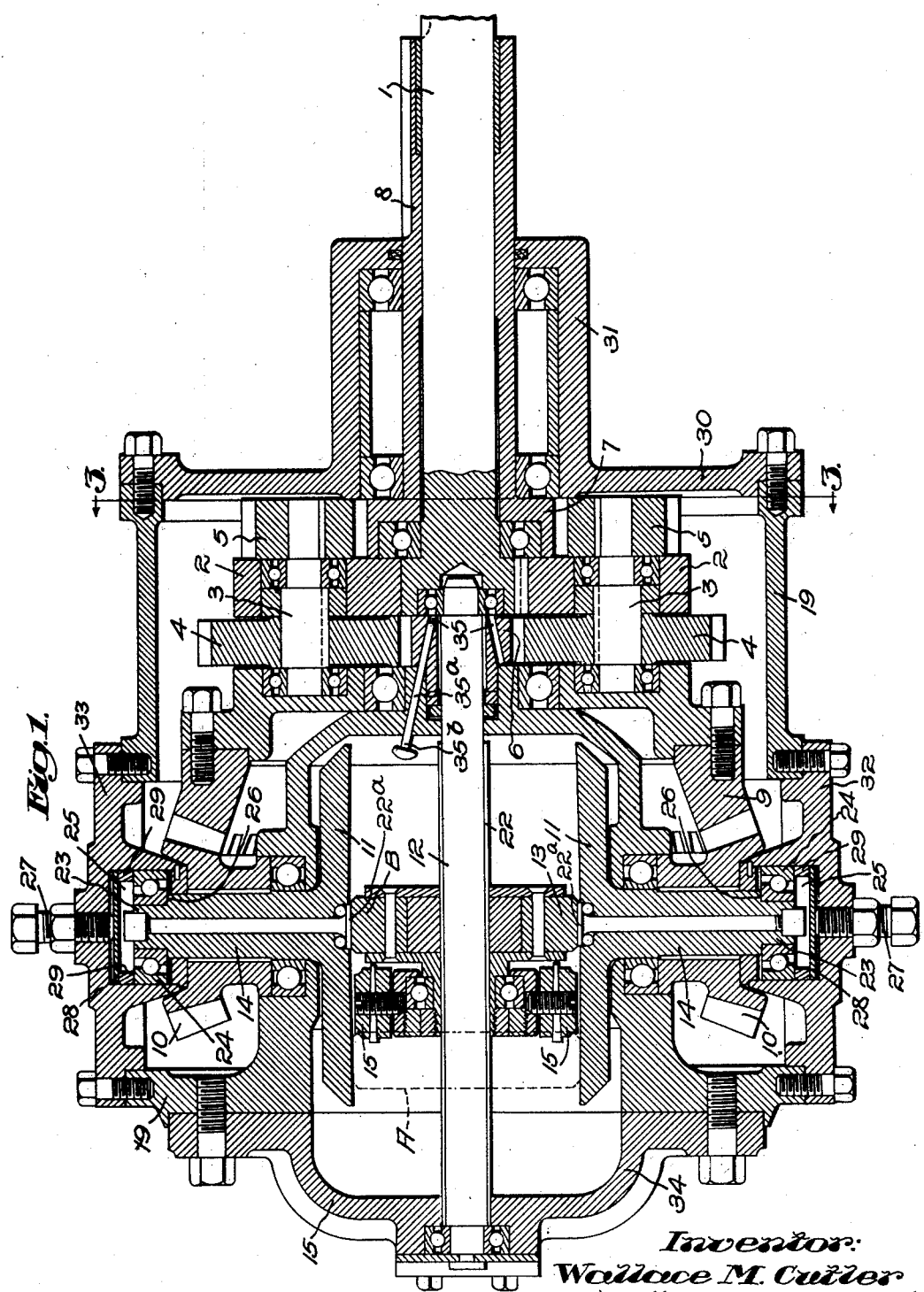

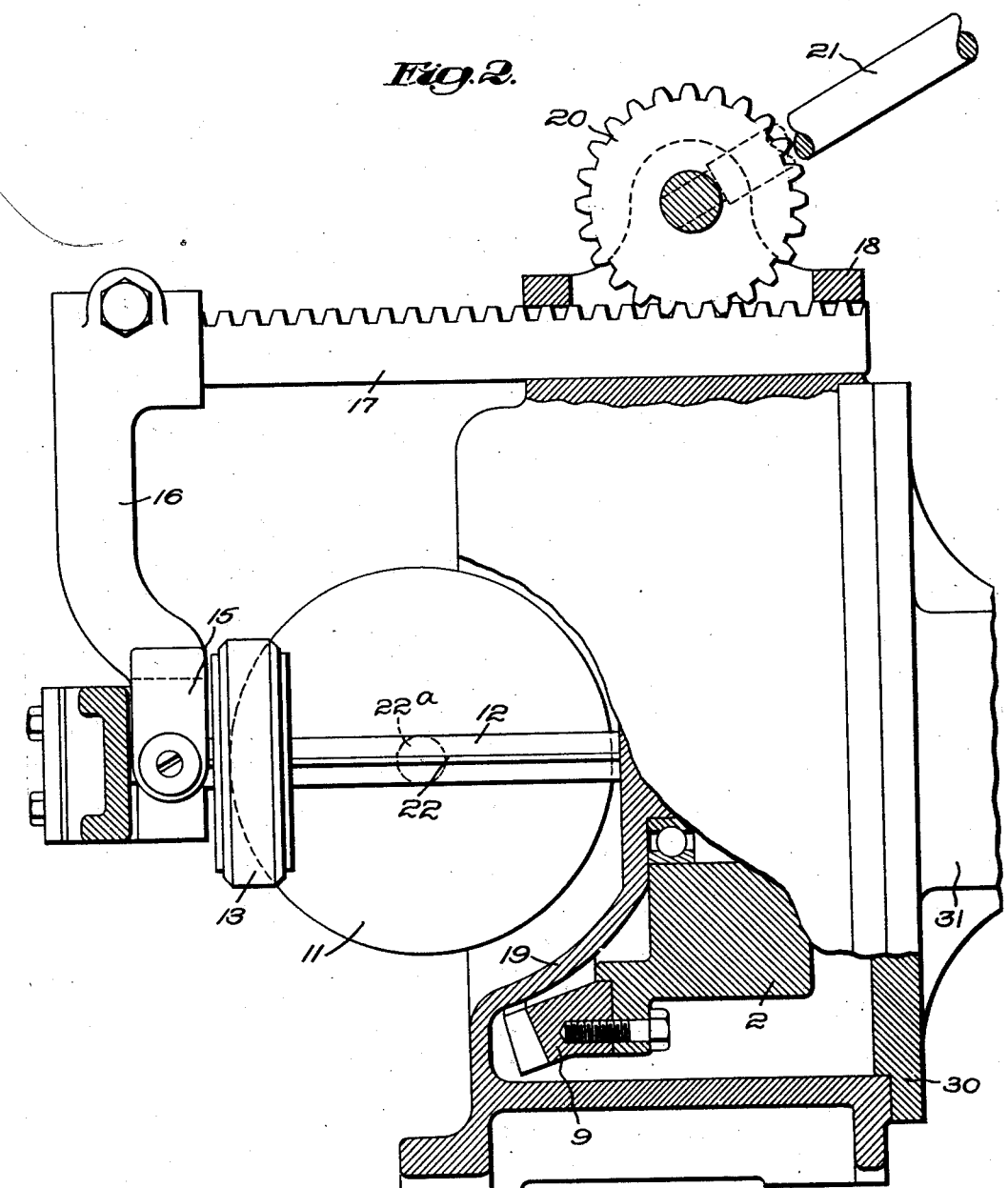

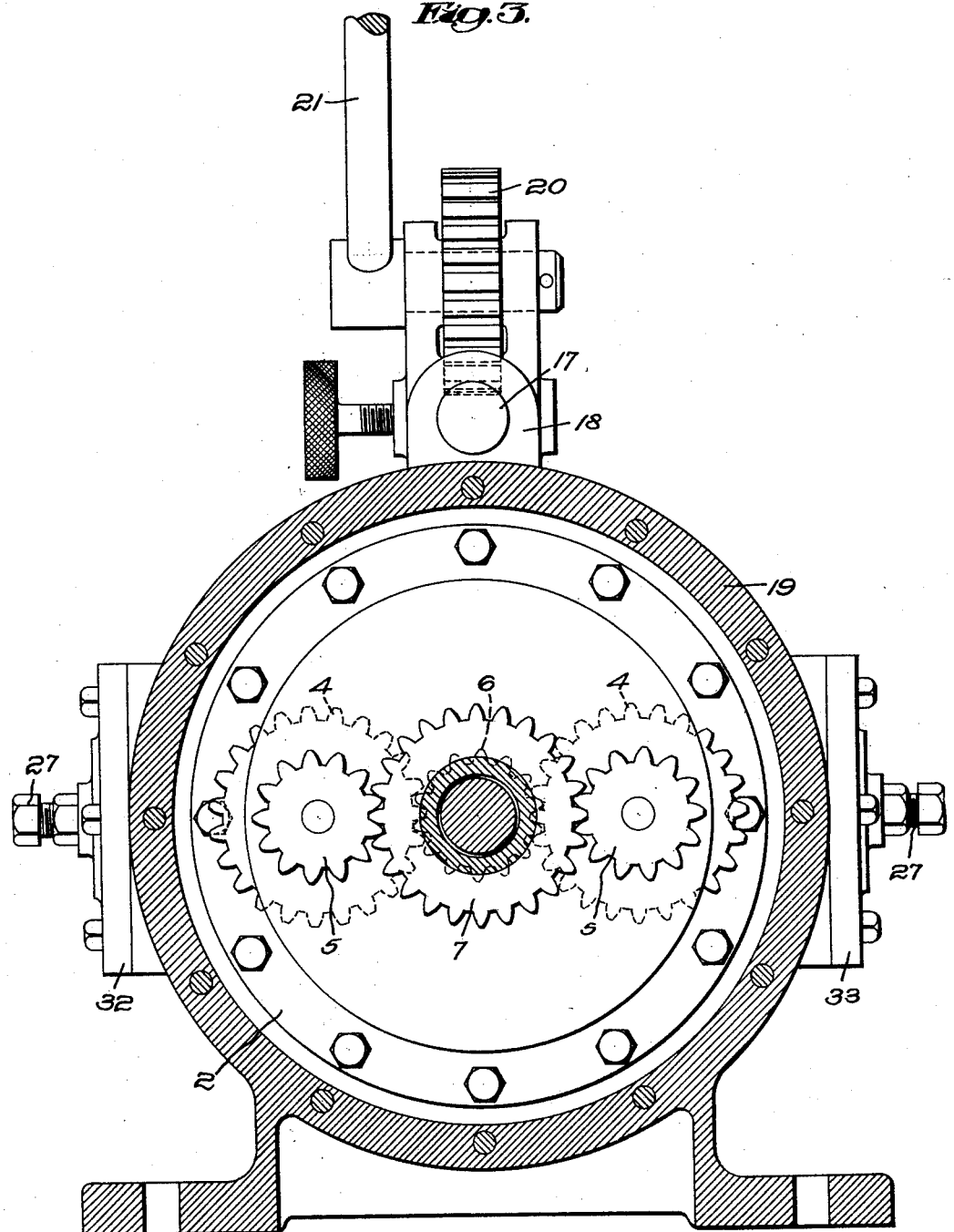

1,859,815

UNITED STATES PATENT OFFICE

WALLACE M. CUTLER, OF ANNISQUAM, MASSACHUSETTS

VARIABLE SPEED MECHANISM

Application filed April 9, 1930. Serial No. 442,797.

My invention aims to provide improvements in a variable speed mechanism.

In the drawings which illustrate a preferred embodiment of my invention:—

Figure 1 is a longitudinal plan section (some parts being in elevation) through a mechanism comprising my invention, and showing the friction wheel in two positions (one being shown in dotted lines) relative to its driving discs;

Fig. 2 is a side elevation of the device selected for illustration, parts thereof being broken away to show in cross section, the means which moves the friction wheel relative to the driving discs; and Fig. 3 is a vertical section through one end of the device and showing the cooperation between the gears of the differential gearing mechanism and gears which cooperate therewith, some of the parts being shown in dotted lines.

Referring now to the form of my invention illustrated, power is applied to the shaft 1 (Fig. 1) by a motor or other desired prime mover or source of power (not shown). Keyed to the inner end of the shaft 1 is a planetary gear cage or spider 2 having journalled therein shafts 3, herein shown as two in number, each carrying, as by having keyed thereto, a pinion 4 and pinion 5. Each pinion 4 meshes with a single speed-determining pinion and the pinions 5 (which rotate at the same speed as pinions 4) each mesh with a single pinion 7 on the variably driven sleeve 8 from which power is taken off by a belt, chain, gearing or other suitable transmission (not shown) to the machine or apparatus (not shown), the speed of which it is desired to control.

It is clear to anyone skilled in the art that, if the speed-determining pinion 6 is held stationary, the sleeve 8 would be revolved in a given direction at constant speed, depending on the intervening gear relations and ratios. It is also clear that, if the pinion 6 were left free to rotate without limitation or control of its speed, no power could be taken off the sleeve 8, as all power applied to the shaft 1 would be uselessly expended in rotating the pinion 6.

I have, however, provided mechanism to control the rate of rotation and the direction of rotation of the pinion 6 and can therefore procure (within limits prescribed by mechanical expendiency for any given design) any desired rate of rotation of the sleeve 8 in either direction, with an intermediate neutral position of no rotation of said sleeve.

This mechanism is herein shown as including the bevel gear 9 carried by the spider 2. The bevel gear 9 rotates about the axis of the shaft 1 and meshes with two bevel gears 10—10 diametrically opposite each other and having connected thereto discs 11—11 facing each other at equal distances from the shaft 12, which is keyed to the hereinbefore described pinion 6. Splined for longitudinal sliding movement on this shaft 12, I provide a friction driven wheel 13 against which the discs 11—11 press with balanced pressure. The discs 11—11 are fixed to shaft 14—14, the axis of each of which is at right angles to the axis of the shaft 1.

The discs 11—11 receive their motion by direct gear drive from the driving shaft 1 revolving at constant speed. The speed at which the friction wheel 13 is revolved (or permitted to revolve) by the discs 11—11 will depend on the position of the friction wheel relative to the discs. To provide for change in this relation, I have provided mechanism typified by the yoke 15 connected by an arm 16 to a rack 17 slidable in a bearing 18 at the side of the casing 19, as shown in Fig. 2. A gear 20, operable by a handle 21, engages the rack 17 to move the friction wheel 13 along its spline 22 on the shaft 12 and hold it in any desired position thereon, thus controlling the rate at which the pinion 6 is revolved (or permitted to revolve) and hence controlling (through the transmission gearing hereinbefore described) the rate of rotation of the pinion 7 and sleeve 8.

The pinion 6 and mechanism for actuating it does not waste power in the sense that power would be wasted if its rate of rotation were controlled by a friction band brake or by a throttled hydraulic pump or other more usual form of retarding mechanism. More-over, the friction wheel 13, balanced between the discs 11—11, is efficient because there is no unbalanced side thrust thereon with incidental excess wear and friction.

Power taken from the prime mover and transmitted to the pinion 6 through the friction disc mechanism is not lost but is returned to perform useful work in rotating the pinion 7 and shaft 8, but it should be noted that the greater part of the power is transmitted direct to the shaft 8 through the differential (Figs. 1 and 3) so that only a relatively small portion thereof will normally pass through the friction wheel 13 and adjacent mechanism. Thus the power capacity of the variable is not limited to the power-transmitting capacity of the friction mechanism but will greatly exceed this, the proportion varying with the gear ratios employed and in any given mechanism with the position of the friction wheel relative to the adjacent driving or controlling discs 11—11. When the friction wheel 13 is in the center position with relation to the discs 11—11 (Fig. 1) and bearing against the parts 22ª, the pinion 6 is locked against turning and all of the power is transmitted through the gear chain to the hollow shaft 8. The parts 22ª are in the form of shafts journaled in the shafts 14 so that the discs 11—11 may rotate while the parts 22ª remain stationary, thereby holding the friction wheel 13 stationary.

While any suitable mechanism may be employed for moving the discs 11—11 toward and away from each other to regulate the pressure exerted upon the friction wheel 13, I have illustrated a preferred form of adjusting mechanism, as shown in Fig. 1. The end 23 of each shaft 14 fits into a ball-bearing retainer 24 located in a bore 25 in the casing 19. The bearing retainer rests against a shoulder 26 adjacent to the end of the shaft and is held thereagainst by a set screw 27 threaded into the casing 19 and having its end pressing against a plate 28 which engages a ring 29 which in turn bears against the bearing retainer 24. Thus, as the set screw is threaded into the casing the shaft 14 is moved axially toward the shaft 12 thereby moving a disc 11 against the friction wheel 13 to increase the pressure. Conversely the pressure may be reduced by unscrewing the set screw 27. The plate 28, which may be laminated, is made of spring metal so that it may yield to permit slight axial movement of the shaft 14, thereby to "take up" any wear upon the discs 11—11 or the friction wheel 13.

The casing 19 is U-shaped in horizontal cross-section (Fig. 1) and has a removable end plate 30 to provide an opening in the casing through which the cage 2 and associated gears and shafts may be entered and removed. The plate 30 also has a bearing 31 in which the hollow driven shaft 8 is journaled. Plates 32 and 33 are provided at opposite sides of the casing to permit access to the casing adjacent to the pinions 10 and associated mechanism, as shown in Fig. 1.

A bracket 34 is secured in position across the open end of the U-shaped casing to provide a fixed bearing for one end of the shaft 12.

By making the casing U-shaped, as described above, the whole device is concentrated in such a manner that practically all of the gears and working parts of the device which have to be lubricated are located inside, or are in communication with the inside, of the casing. It is merely necessary to place a quantity of lubricant within the casing and it will be distributed to the working parts. Thus all of the gears and such of the shafts as carry unbalanced loads are subject to splash lubrication. Suitable packing is provided between the casing and moving parts protruding therefrom to prevent leakage of lubricant.

In practice, I have found that the friction mechanism operates more efficiently and with less wear on the parts by making the faces of the discs 11—11 slightly tapered toward the center so that surfaces at the centers are lower than at the peripheries. This compensates for spring of the metal and loose play of the shafts 14—14 and gives equal pressure on the friction wheel while near the centers of the discs 11—11 or near their peripheries. I also have the surfaces of the parts 22ª just slightly above the surfaces of the discs 11—11 to grip the friction wheel 13 firmly between them as it is moved into contact therewith. The elevation is so slight that it does not interfere with moving the friction wheel 13 by the centers of the discs 11—11.

It should be understood that the speed and horse power of the device depend upon the arrangement of the parts, the ratio of the gears, etc., and that I have illustrated and described one form of device which I have found to work satisfactorily.

In operation, power is applied to the shaft 1 which turns the spider 2 carrying the bevel gear 9. The gear 9 rotates the pinions 10—10 which in turn rotate the discs 11—11. At the same time the planetary transmission gearing is rotating with the spider 2 to transmit power through the pinion 7 to the driven shaft 8. The speed at which the shaft 8 is permitted to rotate and its direction of rotation are controlled by the friction mechanism. Thus when the friction wheel is in contact with the discs 11—11 at the position A (shown in dotted lines, Fig. 1), the speed at which the gear 6 is rotated is such that no rotation of the sleeve 8 is effected by rotation of the shaft 1. However, as the friction wheel 13 is moved toward the centers of the discs, rotation of the pinion 6 decreases, thereby permitting the planetary to effect rotation of the pinion 7 and sleeve 8. The speed of rotation of the sleeve 8 is increased as the friction wheel 13 nears the centers of the discs 11—11 and the most desirable operating position of the device is with the friction wheel 13 in contact with the parts 22ᵃ, as shown at B in Fig. 1. In this position the friction wheel 13 will not rotate and hence will not wear. By moving the friction wheel 13 past the centers of the discs 11—11 toward the pinion 6, I can increase the speed of rotation of the shaft 8, if an increase in speed is required over that provided by the most desirable operating position above described.

If for any reason it is desirable to reverse the direction of rotation of the shaft 8, I may do so by moving the friction wheel 13 from the position A toward the peripheries of the discs in a direction away from the planetary gearing.

A feature of my invention is the fact that the mechanism can continue to operate at normal speed and the friction discs 11—11 and friction wheel 13 can be removed for repair or replacement. To accomplish this the friction wheel 13 is moved to position B (Fig. 1) and then suitable locking means is moved into locking engagement with the pinion 6, thereby preventing rotation of the pinion 6. In the particular locking means illustrated, I have shown a series of holes 35 provided in the pinion 6, a hole 35ᵃ in the casing 19 adapted to align with a hole 35 and a pin 35ᵇ which is pushed into the hole 35ᵃ and one hole 35. After the pin 35ᵇ has been inserted to lock the pinion 6, the bearing 34 may be removed and the friction wheel 13 and shaft 12 pulled out. With these parts removed the discs 11—11 may be pulled out as will be seen very readily from an inspection of Fig. 1 of the drawings. The parts removed may be repaired or renewed and then assembled as easily as they were disassembled, all the while the device being in operation. Upon removal of the pin 35ᵇ the device is ready for variable operation again.

My variable speed mechanism is simple in construction, compact and durable. It should be noted that the shaft 1, hollow shaft 8, shaft 12 and the differential mechanism rotate about a common axis while the friction discs rotate about an axis which is at right angles to the common axis. This arrangement of the parts provides for simplicity of construction and compactness.

While I have illustrated and described a preferred embodiment of my invention, I have done so for purposes of clarification and not of limitation, the scope of my invention being best defined by the following claims.

I claim:

1. A variable speed mechanism comprising, in combination, a driving shaft, a hollow driven shaft concentric with and surrounding the driving shaft, a variable friction mechanism located beyond the ends of said driving and driven shafts and being driven from said driving shaft and including a friction wheel mounted upon a shaft rotating about the same axis as the driving and driven shafts but extending beyond the ends thereof, a differential gearing interposed between the driving and driven shafts and a pinion carried by the shaft which carries the friction wheel, said pinion being in mesh with the differential gearing as and for the purposes described.

2. In a variable speed mechanism, a variable speed friction mechanism, comprising opposed discs mounted upon independent shafts, a gear carried by each of said shafts and a third gear meshing with the gears carried by the said shafts, said third gear being suitably driven to drive said discs at the same speed of rotation, a friction driven wheel mounted upon a shaft between said discs and means operable to move said wheel relative to said discs, thereby to decrease and increase the speed of rotation of the shaft upon which said wheel is rotated with relation to said shafts which carry said discs, a planetary transmission mechanism associated with said friction mechanism, a casing housing all of the gears of the device therein and being lubricant tight thereby permitting lubrication of all of the moving parts within the casing by a single supply of lubricant free to circulate through the casing and means supporting said friction mechanism outside of the casing thereby being free of lubricant and readily accessible.

3. In a variable speed mechanism, a variable speed friction mechanism comprising opposed discs mounted upon independent shafts, a pinion gear of smaller diameter than the disc and carried by each of said shafts and a third relatively large gear comprising a body portion and a toothed portion, the toothed portion projecting laterally over said disks and meshing with the small pinion gears to drive said discs at a relatively high rate of speed with relation to the speed at which the said third gear is driven, a friction driven wheel mounted upon a shaft between said discs and adapted to be moved past the centers thereof and means operable to move said wheel relative to said discs thereby to decrease and increase the speed of rotation of the shaft upon which said wheel is rotated with relation to the shafts which carry said discs and a planetary transmission mechanism associated with said friction mechanism.

4. In a device of the class described a casing substantially U-shaped in one cross-sectioned plane thereof, said casing housing all of the gears of the device therein and being lubricant tight, thereby permitting lubrication of all of the moving parts within the casing by a single supply of lubricant free to circulate through the casing, a yoke across the open end of the U-shaped casing providing a bearing for a shaft and a friction mechanism operable in the space enclosed by the U-shaped casing and the yoke across the open end of the U.

5. A variable speed mechanism comprising, in combination, a driving part, a driven part, a friction mechanism operatively interposed between the driving and driven parts, said friction mechanism including a disc operatively connected to said driving part, a friction wheel shiftably mounted for movement transversely of the disc-carrying part, said friction wheel pressed against the face of said disc, a part located in the center of said disc relative to which said disc may rotate whereby when said friction wheel is moved to the center of the disc it may rest without rotation on the said part while the disc may rotate relative to said part and said friction wheel without injury to the said friction wheel, said disc having a face tapering from its periphery toward the center so that that portion adjacent to the said part in the center is lower than the periphery and the said part having a face which is slightly above the adjacent surface of the said disc, as and for the purposes described.

6. A variable speed mechanism comprising, in combination, a driving shaft, a driven shaft, a friction mechanism connected between the driving and driven shafts and a differential gearing mechanism interposed between the friction mechanism and the driven shaft as and for the purposes described, said friction mechanism including a disc driven from said driving shaft, a friction wheel mounted upon a shaft rotating about the same axis as said differential and locking means operable to lock part of the differential gearing against rotation thereby to permit removal and replacement of the friction mechanism while the remainder of the mechanism continues to operate and deliver useful power.

7. A variable speed mechanism comprising, in combination, a driving shaft, a driven shaft, friction mechanism including opposed friction discs supported on shafts extending away from each other and driven through gearing located outside of the space between said discs and connecting said shafts to said driving shaft, a friction driven wheel engaging both of said friction discs, said friction driven wheel mounted on a shaft to be driven by said friction mechanism, a differential gearing interposed between said shaft carrying said friction driven wheel and the said driven shaft and means operably connected to said friction driven wheel to move it in a line passing through the axis of the opposed friction discs and a housing for said device constructed so that only the ends of the driving and driven shafts and the friction mechanism remain outside said housing for the purposes described.

8. A variable speed mechanism comprising, in combination, a differential gearing, a driving shaft and a hollow driven shaft concentric with and surrounding the driving shaft, said shafts being located at one side of said differential gearing and a variable friction mechanism located at the other side of said differential gearing and including a friction wheel mounted upon a shaft rotating about the same axis as the driving and driven shafts and also including two friction discs secured to shafts located at opposite sides of the friction wheel and connected through suitable gearing to said differential gearing.

In testimony whereof, I have signed my name to this specification.

WALLACE M. CUTLER.